US009094526B2

(12) United States Patent
Krutsch et al.

(10) Patent No.: US 9,094,526 B2
(45) Date of Patent: *Jul. 28, 2015

(54) CONFERENCE CALL SYSTEM, METHOD, AND COMPUTER PROGRAM PRODUCT

(71) Applicant: FREESCALE SEMICONDUCTOR, INC., Austin, TX (US)

(72) Inventors: Robert Krutsch, Munich (DE); Radu D. Pralea, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,053

(22) Filed: Dec. 30, 2013

(65) Prior Publication Data

US 2014/0112464 A1    Apr. 24, 2014

Related U.S. Application Data

(63) Continuation of application No. 13/501,472, filed as application No. PCT/IB2009/054943 on Nov. 6, 2009, now Pat. No. 8,619,963.

(51) Int. Cl.
*H04M 3/42* (2006.01)
*H04M 11/00* (2006.01)
(Continued)

(52) U.S. Cl.
CPC .............. *H04M 3/569* (2013.01); *H04M 3/566* (2013.01); *H04M 2203/5072* (2013.01); *H04M 2242/06* (2013.01)

(58) Field of Classification Search
CPC ................. H04M 2203/5072; H04M 2242/06; H04M 3/42; H04M 3/56; H04M 3/562; H04M 3/563; H04M 3/564; H04M 3/565; H04M 3/566; H04M 3/567; H04M 3/568; H04M 3/569; H04M 3/42221; H04M 7/006; H04M 7/15; H04M 7/146; H04L 12/18; H04L 12/1813; H04L 12/581; H04L 65/403; H04L 67/24

USPC ................ 379/90.01, 93.01, 93.21, 157, 158, 379/201.01, 202.01, 207.01; 370/259, 260, 370/261, 262; 455/414.1, 416

See application file for complete search history.

(56) References Cited

U.S. PATENT DOCUMENTS 4,388,717 A  *  6/1983  Burke ........................... 370/261
4,466,094 A  *  8/1984  Renner ......................... 370/263

(Continued)

FOREIGN PATENT DOCUMENTS

JP    2000-322753 A    11/2000
JP    2008079024 A    4/2008

(Continued)

OTHER PUBLICATIONS

Prasad et al.; "On the Problem of Specifying the Number of Floors for a Voice-Only Conference on Packet Networks"; International Conference of Information Technology, Research and Education, 2003 (ITRE2003); Aug. 11-13, 2003; pp. 22-26;New Jersey, US.

(Continued)

*Primary Examiner* — Khai N Nguyen

(57) ABSTRACT

A conference call system comprises an input interface for receiving during a conference call at least two input streams of audio signal, each from another source. A selection unit is connected to the input interface, for selecting a number of dominant speaker streams out of the input streams, the number being less than or equal to a maximum number of dominant speakers value and each of the dominant speaker streams representing speech from a respective dominant speaker. A mixer is connected to the selection unit, for mixing the selected streams into an output stream. The conference call system comprises an output interface for outputting the output stream and a selection control unit connected to the selection unit and the input interface, for dynamically setting, during the conference call, the maximum number of dominant speakers value based on dynamics of the conference call.

20 Claims, 3 Drawing Sheets

(51) Int. Cl.
*H04M 1/00* (2006.01)
*H04L 12/16* (2006.01)
*H04Q 11/00* (2006.01)
*H04M 3/56* (2006.01)

(56) References Cited

U.S. PATENT DOCUMENTS

| | | | | |
|---|---|---|---|---|
| 4,488,291 | A * | 12/1984 | Eschmann et al. | 370/267 |
| 4,495,616 | A * | 1/1985 | Shuh | 370/263 |
| 4,499,578 | A * | 2/1985 | Marouf et al. | 370/267 |
| 4,757,493 | A * | 7/1988 | Yuen et al. | 370/263 |
| 4,845,499 | A * | 7/1989 | Bruce | 341/143 |
| 6,369,846 | B1 | 4/2002 | Katsumi | |
| 7,330,541 | B1 | 2/2008 | Surazski et al. | |
| 8,436,888 | B1 * | 5/2013 | Baldino et al. | 348/14.08 |
| 2002/0097857 | A1* | 7/2002 | Kwan | 379/202.01 |
| 2002/0181686 | A1 | 12/2002 | Howard et al. | |
| 2003/0198195 | A1 | 10/2003 | Li | |
| 2005/0094795 | A1 | 5/2005 | Rambo | |
| 2006/0146735 | A1 | 7/2006 | Shaffer et al. | |
| 2007/0263821 | A1* | 11/2007 | Shaffer et al. | 379/202.01 |
| 2008/0049921 | A1 | 2/2008 | Davis et al. | |
| 2009/0079815 | A1 | 3/2009 | Baird | |
| 2009/0220064 | A1* | 9/2009 | Gorti et al. | 379/202.01 |
| 2009/0253418 | A1 | 10/2009 | Makinen | |
| 2010/0020954 | A1* | 1/2010 | Gilg et al. | 379/202.01 |
| 2010/0165889 | A1 | 7/2010 | Madabhushi et al. | |
| 2011/0093273 | A1* | 4/2011 | Lee et al. | 704/270 |

FOREIGN PATENT DOCUMENTS

| | | |
|---|---|---|
| KR | 10-2000-0059487 A | 10/2000 |
| KR | 10-2007-0080017 A | 8/2007 |

OTHER PUBLICATIONS

Prasad et al.; Automatic Addition and Deletion of Clients in VoIP Conferencing:; Sixth IEEE Symposium on Computers and Communications (ISCC); 2001; pp. 386-391.

International Search Report mailed Aug. 6, 2010, for International Application No. PCT/IB20091054943, 3 pages.

* cited by examiner

CONFERENCE CALL SYSTEM, METHOD, AND COMPUTER PROGRAM PRODUCT

CROSS-REFERENCE TO RELATED APPLICATION(S)

This application is a continuation of U.S. patent application Ser. No. 13/501,472, entitled "CONFERENCE CALL SYSTEM, METHOD, AND COMPUTER PROGRAM PRODUCT," filed on Apr. 12, 2012, now U.S. Pat. No. 8,619,963, which is a National Stage Entry under 37 C.F.R. §371 of PCT/IB09/54943, filed Nov. 6, 2009, the disclosures of which are hereby expressly incorporated by reference in their entirety.

FIELD OF THE DISCLOSURE

This invention relates to a conference call system and method, as well as a computer program product.

BACKGROUND

In current voice conferencing systems, a speaker selection algorithm in a conferencing bridge detects active speakers and creates an output stream by mixing the audio for the active speakers or active participants. The active stream is then communicated to the participants on the conference call. However, selection of the active speakers involves selecting a predetermined number of most active speakers, commonly referred to as the dominant speakers, based on energy levels of voice communications received from the telephony endpoints where the active speakers are located. All other speakers are excluded from the speaker selection algorithm when speech from the dominant speakers is received.

For example, United States Patent Application publication US20071263821 A1 describes a method and apparatus to provide speaker selection in a multi-party conference call. The method comprises processing a speaker queue for at least one new speaker and monitoring when a number of dominant speakers is less than a predetermined number of dominant speakers. When the predetermined number of dominant speakers is less than the predetermined number, the method automatically, without human intervention, adds the new speaker from the speaker queue to the dominant speakers.

Conventional speaker selection algorithms by design end up not allowing new speakers to join until one of the dominant speakers has been quiet for a while. Although this eliminates interruptions it also precludes new speakers from the opportunity to speak if the dominant speakers continue to keep speaking

SUMMARY

The present invention provides a conference call system, a conference call method, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE DRAWINGS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
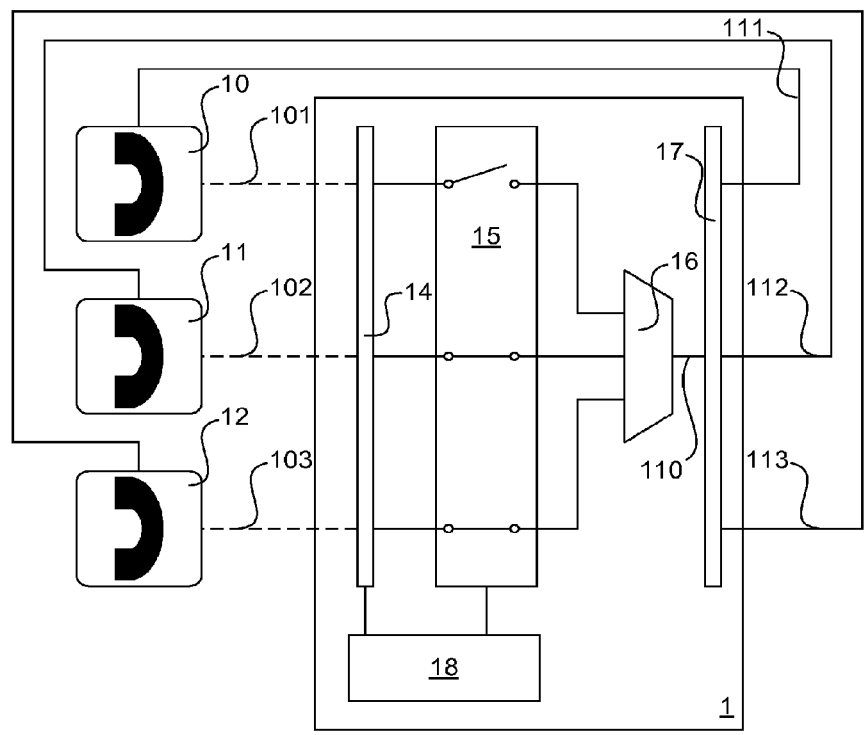
FIG. 1 schematically shows a block diagram of an example of an embodiment of a conference call system.

Referring to FIG. 1, the example of a conference call system 1 shown therein comprises an input interface 14. During a conference call two, or more than two, input streams 101-103 containing audio are received at the interface 14. Each of the input streams originates from another source 10-12, e.g. a telephone or other communication unit of a speaker. It will be apparent that in addition to these input streams, other input streams may be received, which may or may not originate from the same sources. In addition, it will be apparent that multiple persons may share the same telephone or other audio communication unit. In the following the term "dominant speaker" refers to a source selected as a "dominant speaker" which may be used by one person or more than one person. The term "non-dominant speaker" refers to a source which may or may not exhibits behaviour satisfying the criteria for a dominant speaker but which is not selected as a dominant speaker. The term "additional dominant speaker" refers to a source which exhibits behaviour satisfying the criteria for a dominant speaker but which is not yet selected as a dominant speaker.

The input streams each comprise data or signals representing at least audio from the source, and may in addition thereto comprise video and/or data. The audio may for example consist of voiced audio, e.g. speech, and comprise other types of audio as well, such as background noise, non-voiced sounds, background rumour. The audio may for example be unfiltered or have been filtered to remove undesired components, such as noise, non-voiced sounds, background rumour or otherwise.

The conference call system 1 shown in FIG. 1 further comprises a selection unit 15 which is connected to the input interface 14. The selection unit 15 selects, when the system 1 is in operation, a number of dominant speaker streams out of the input streams 101-103. The selected number K is less than or equal to a maximum number of dominant speaker value $K_{max}$. As shown in the example, the maximum number of dominant speaker value $K_{max}$ is set to 2 and a number of input streams 102,103 equal to the maximum number of dominant speaker value is selected. However, a number lower than the maximum number of dominant speaker value may be selected as well.

The selection may be performed using any criteria suitable to select dominant speaker streams. For example, the selection may be performed automatically, without human interference by selecting the $K_{max}$ number of loudest streams. In this respect, the term "loudest" refers to the streams in which the highest intensity in a signal of interest is observed. The signal of interest may for example be the audio signal as a whole or a part of the audio signal, such as the voiced part thereof, without background noise and non-voiced parts. The signal of interest may for example be taken over one or more periods of time, e.g. the loudness during one or a multiple of time-windows may be used as a selection criterion.

For instance, a loudness number A may be calculated for the audio in each stream and the streams with the $K_{max}$ highest loudness numbers $\lambda_1, \lambda_2, \ldots, \lambda_{Kmax}$ may be selected. A suitable method for calculating the loudness number is described in: Prasad, Venkatesha R.; Kuri, Joy; Jamadagni, H S; Dagale, Haresh; and Ravindranath, Ravi A., "Automatic Addition and Deletion of Clients in VoIP Conferencing," ISCC, pp. 0386, Sixth IEEE Symposium on Computers and Communications (ISCC'01), 2001, hereinafter referred to as "the ISCC 2001 paper" and incorporated herein by reference.

The loudness number $\lambda$ may for example be a function of the present and past amplitudes of the input stream. The loudness number $\lambda_i$ of a stream i can for example be computed from the current activity $L_1$ during a "recent past" window $W_{rp}$, the past activity $L_2$ in a "distant past" window $W_{dp}$ and the overall past activity L.sub.3 in a "overall past" window $w_{op}$. The current activity L.sub.1 may for example be the moving average of the amplitude during the recent past window $W_{rp}$. The past activity $L_2$ may for example be the moving average of the amplitude during the distant past window $W_{dp}$. The past activity $L_2$ may for example be the moving average of the amplitude during the distant past window $W_{dp}$. The overall past activity $L_3$ may for example be the moving average of the amplitude during the distant past window $W_{ap}$.

Figure 6:
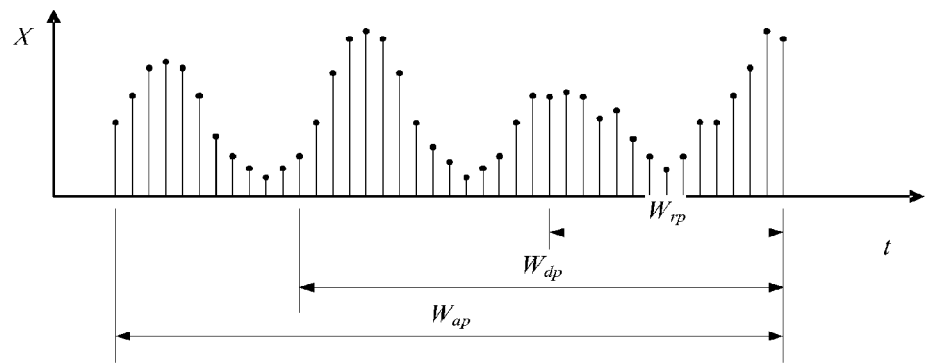
FIG. 6 schematically shows a graph illustrating recent past, distance past and overall past time windows.

As illustrated in FIG. 6, the recent past" window $W_{rp}$ may extend from a current point in time $T_0$ to a past point in time $T_{-1}$ preceding current point in time $T_0$. The "distant past" window $W_{dp}$ may extend, e.g. from the current point in time $T_0$, to a distant point in time $T_{-2}$ preceding past point in time $T_{-1}$. The "overall past" window $W_{op}$ may extend, e.g. from the current point in time $T_0$, to the more distant point in time $T_{-3}$ preceding distant point in time $T_{-2}$.

The activities $L_1, L_2, L_3$ may for example be calculated by performing an operation as can be described by the mathematical formula:

$$L_1 = \frac{1}{W_{rp}} \sum_{W_{rp}} X_{k,i}; \quad L_2 = \frac{1}{W_{dp}} \sum_{W_{dp}} X_{k,i}; \quad L'_{3,k} = L_{3,k} + \Theta * I_{X_k};$$

$$L_{3,k} = L'_{3,k} - \frac{L'_{3,k}}{W_{ap}},$$

in which $X_{k,i}$ is the amplitude of the k-th sample of the i-th input stream $\Theta$ is a binary operation which operates relative to the maximum amplitude max(X(k)) found in the input streams and may for example be calculated by performing an operation as can be described by the mathematical formula:

$$\Theta = \begin{cases} 1 & \text{if } X_{k,i} > 0.1 * \max(X(k)) \\ 0 & \text{else,} \end{cases}$$

in this equation (2), the value 0.1 is a threshold value, which may be set to any value suitable for the specific implementation and for example be selected from the group of 0.1 and 0.2, as well as all intermediate points between 0.1 and 0.2.

The loudness number $\lambda$ may for example be a weighted sum of the activities L.sub.1, L.sub.2, L.sub.3, and for example be calculated by performing an operation as can be described by the mathematical formula:

$$\lambda = \alpha_1 * L_1 + \alpha_2 * L_2 + \alpha_3 * L_3$$

where $\alpha_1, \alpha_2, \alpha_3$ are constants with a suitable value. Values suitable have found to be, for instance, $\alpha_1 = 0.6$; $\alpha_2 = 0.3$; $\alpha_3 = 0.3$ but other values may be used as well.

The dominant speaker streams may be selected in another manner, and for example be selected based on the content of the speech in the input streams, e.g. in the manner described in US 2007/263821 or any other suitable manner.

In the example shown in FIG. 1, a mixer 16 is connected to the selection unit 15. The mixer 16 mixes, in operation, the selected streams into an output stream 110. As shown, an output interface 17 is connected to the mixer 16 in order to receive the output stream 110. Via the output interface 17 the output stream 110 is outputted to one or more communication units connected to the conference call system 1, in this example to the communication units which constitutes the sources 10-12. Thus, via the shown communication units, the persons participating in a conference call can both speak and listen to other participants. It will be apparent that the output stream 110 may also be outputted to other communications units which allow the participant to listen only, for example communication units with a speaker unit on "mute" or from which the input stream is not selected as a dominant speaker stream. For example in a conference call with a large number of participants and a limited number of speaker, the output stream may be broadcast into the network to all participants.

In the shown example, the output interface 117 splits the output stream 110 into multiple streams 111-113. However, alternatively, the output interface 117 may output the output stream 110 which is then distributed further to the respect communication units by another node in a telecommunication network.

In the example of FIG. 1, a selection control unit 18 is shown which is connected to the selection unit 14 and the input interface 15. The selection control unit 18 dynamically sets, during the conference call, the maximum number of dominant speakers value $K_{max}$ based on dynamics of the conference. Thus, new dominant speakers can be added, thereby avoiding that one or more participants which at a point in time are dominant speakers block the input streams from other participants in the conference call that are trying to speak in the call.

The selection control unit 18 may be implemented to set the maximum number of dominant speakers value $K_{max}$ based on dynamics of the conference in any manner suitable for the specific implementation. For example, the selection control unit 18 may set the maximum number of dominant speakers value $K_{max}$ to equal the number of input streams of which the loudness exceeds a predetermined threshold or any other suitable manner.

Figure 2:
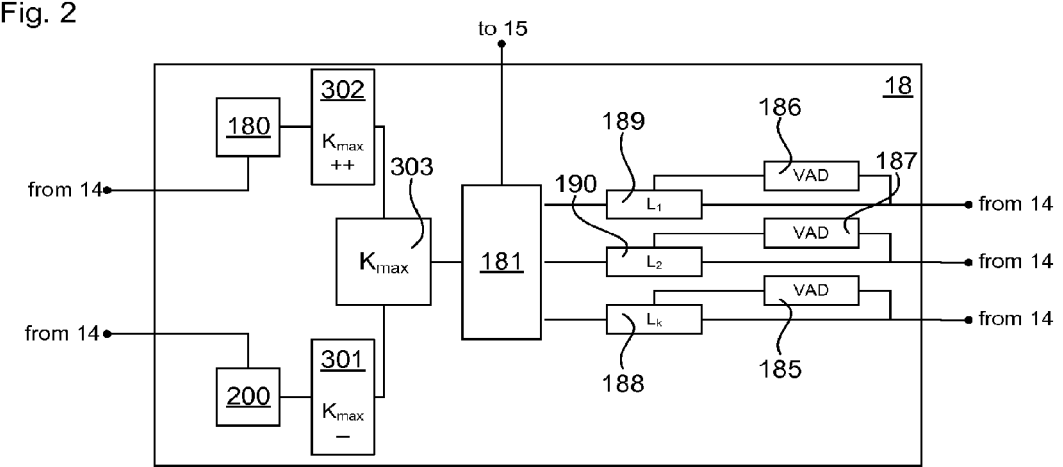
FIG. 2 schematically shows a block diagram of an example of an embodiment of a selection control unit, suitable for the example of FIG. 1.

Referring to FIG. 2, the selection control unit 18 may comprise a comparator 181. As shown, a memory unit 303 is connected to the comparator 181 and the comparator is further connected to the input interface 14. In the memory 303, the maximum number of dominant speakers value $K_{max}$ is stored.

The comparator 181 can compare the input streams 101-103 and select the dominant speaker streams out of the input streams 101-103. A suitable technique for selecting the dominant speaker streams is described in Prasad, Venkatesha R.; Jamadagni, H S; and Shankar, H N: "*On the Problem of Specifying the Number of Floors for a Voice-Only Conference on Packet Networks*", International Conference on Information Technology: Research and Education, 2003. ITRE2003, 11-13 August, New Jersey, USA, 22-26, hereinafter referred to as "the ITRE2003 paper", incorporated herein by reference. The comparator 181 may for example select the inputs streams for which the loudness number $\lambda$ exceed a predetermined threshold representative for dominant speaker streams, up to a maximum of $K_{max}$. If the number of input streams above the threshold exceeds $K_{max}$ as explained above, the comparator 181 may for example compare the input streams to select the $K_{max}$ number of input streams with the highest loudness numbers. The comparator 181 may periodically repeat the comparison, and may thereby avoid that a dominant stream remains selected even when the corresponding input stream does not contain voice any more.

In the shown example, the comparator 181 is connected to the input interface 14 via respective calculators 188-190 which are arranged to calculate for each of the input streams 101-103 the loudness value $\lambda$ from a parameter of the respective input stream representative of the loudness of the audio, e.g. as explained above. In the shown example, a separate calculator is present for each input stream 101-103 and the calculators 188-190 are connected to the input interface 14. For each of the calculators 188-190 a voice detector 185-187 is connected with an input to the input interface 14. The voice detectors 185-187 can detect voice in the input streams 101-103. The voice detectors 185-187 enable the respective calculator 188-190 when voice is detected and disable the respective calculator 188-190 or otherwise ensure that it outputs the lowest loudness number when no voice is detected. Thereby, only those input streams from which voiced signals are receive can potentially be selected by the comparator 181. The voice detectors 185-187 may be implemented in any manner suitable to detect voice, such as known in the art, and for the sake of brevity are not described in further detail. A suitable implementation is described in for example Prasad, Venkatesha R.; Sangwan, Abhijeet; Jamadagni, H S; Chiranth, M C and Sah, Rahul "*Comparison of Voice Activity Detection Algorithms for VoIP*", Seventh International Symposium on Computers and Communications, 2002. ISCC 2002, 1-4 July, Taormina-Giardini Naxos, Italy, pp. 530-535, hereinafter referred to as the "ISCC 2002 paper" and incorporated herein by reference.

The selection control unit 18 may for instance comprise a first logic unit 301 and a second logic unit 302. In the shown example, the logic units 301,302 are connected with their respective inputs to the interface 14. The logic units 301,302 are connected with their outputs to the memory unit 303 in which the maximum number of dominant speaker value $K_{max}$ is stored.

Figure 3:
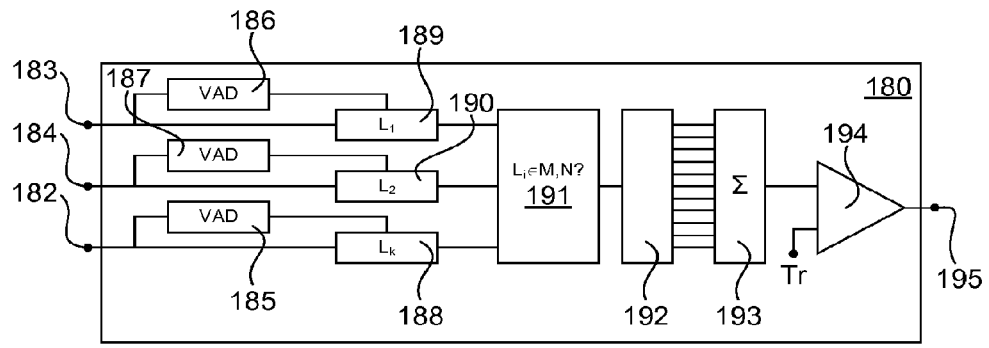
FIG. 3 schematically shows a block diagram of an example of an embodiment of a new dominant speaker detector.

As explained below in more detail with reference to FIGS. 3 and 4, the first logic unit 301 may increase the maximum number of dominant speakers value $K_{max}$ when a dominant speaker increase criterion is met whereas the second logic unit 302 may decrease the maximum number of dominant speakers value when a dominant speaker decrease criterion is met.

The first logic unit 301 may for example be connected to a new speaker detector 180. In the shown example, the new speaker detector connects the first logic unit 301 to the input interface 14. However, it will be apparent that other units may be present between the first logic unit 301 and the input interface 14.

The new dominant speaker detector 180 can detect out of the input streams additional dominant speaker streams, i.e. additional to the input streams selected as dominant speaker streams. If the detectors 180 detects an additional dominant speaker stream, the detector 180 outputs an additional dominant speaker notification to the first logic unit 301. The first logic unit 301 then determines, e.g. in response to the notification, whether or not to increase the maximum number of dominant speakers value. For example, when the current number of dominant speakers is below the maximum number of dominant speakers value $K_{max}$ the first logic unit 301 may maintain the maximum number of dominant speakers value as is, and when the current number of dominant speakers is equal to the maximum number of dominant speakers value, the first logic unit 301 may increment the value $K_{max}$ by 1.

The new dominant speaker detector 180 can detect additional dominant speaker streams in any manner suitable for the specific implementation. To that end, the new dominant speaker detector 180 can compare one or more parameters of the input stream with one or more criteria suitable to detect additional dominant speaker streams.

The parameter may for example be the loudness. Referring to the example shown in FIG. 3, the new dominant speaker detector 180 may for example comprise one or more calculators 188-190 connected to the input interface 14. The calculators calculate for each of the input streams 101-103 a loudness value $\lambda_1, \lambda_2, \lambda_3$ from a parameter of the respective input stream representative of the loudness of the audio. In the shown example, a respective calculator 188-190 is present which is connected with a calculator input to a respective detector input 182-183 of the new dominant speaker detector 180. At the detector inputs 182-183 the input streams 101-103 may be received.

In the shown example, the new dominant speaker detector 180 further includes voice detectors 185-187 connected with their inputs to the detector inputs 182-183 and with their outputs to respective control inputs of the calculators 188-190. The voice detectors 185-187 compare one or more parameters of the input streams with criteria suitable to detect voice in the input streams. The new dominant speaker detectors 180 enable a corresponding calculator when voice is detected in an input stream which before did not comprise voice. Thereby, it may be ensured that only input streams which comprise voice can be assigned as dominant speakers and that, for example, input streams with a high audio amplitude due to noise or non-voiced audio (e.g. music) remain non-dominant and accordingly, the overall quality of the conference call can be improved. Although in the example of FIG. 3 voice detectors 185-187 are shown for each of the input streams 101-103, it will be apparent that the voice detectors 185-187 may be applied alternatively to only some of the input streams, such as the non-dominant speaker streams thereof.

Figure 7:
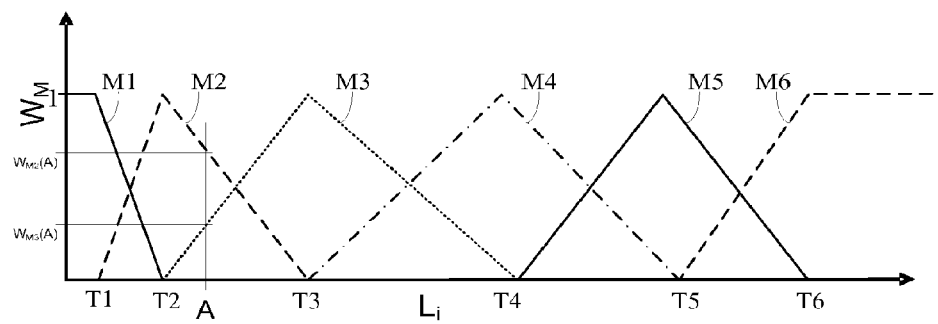
FIG. 7 schematically shows a graph illustrating classifying input streams in different categories, using the loudness as a classifier.

The shown new dominant speaker detector 180 further comprises a classifier 191 connected to the calculator. The classifier 191 classifies a non-dominant stream of the input streams 101-103 based on at least the loudness value corresponding to the respective non-dominant stream i in one or more categories $M_1$-$M_6$,$N_1$-$N_7$. In the shown example, the classifier 191 classifies the input stream in respective categories of two sets $M_1$-$M_6$ and $N_1$-$N_7$. The classification in the first set $M_1$-$M_6$ is based on the loudness value $\lambda$, whereas the classification in the second set $N_1$-$N_7$ is based on the differential loudness value $\Delta\lambda_i$ which is the difference between the loudness value $\Delta\lambda_i$ and the loudness value $\Delta\lambda_a$ of the last dominant speaker elected at the point the last dominant speaker was elected. FIG. 7 shows a graph of the categories $M_1$-$M_6$ as a function of the loudness value $\lambda_i$. FIG. 7 shows a graph of the categories $N_1$-$N_7$ as a function of the differential loudness value $\Delta\lambda_i$. The vertical axis indicates a weighing factor $W_M$, $W_N$ which are respectively a function of the loudness value and the differential loudness value $\Delta\lambda_i$. As shown, upper and lower limits T1-T5 determine the membership of the input stream to the respect categories $M_1$-$M_6$. Upper and lower limits P1-P6 determine the membership of the input stream to the respect categories $N_1$-$N_7$.

For example, for a loudness value $\lambda_i$ of T2, the input stream i will be classified in category M2 with $W_M$=1. For a loudness value $\lambda_i$ of T3, the input stream will be classified in category M3 with $W_M$=1. For a loudness value $\lambda_i$ between T2 and T3, e.g. $\lambda_i$=A, the input stream will be classified in categories M2 and M3 with a weighing factor $W_{m2}(A)$ for M2 as defined by the continuous line and a weighing factor $W_{m3}(A)$ for M3 as defined by the dashed line.

The shown new dominant speaker detector 180 further comprises a detector logic unit 192 connected to the classifier 191. When in operation, the detector logic unit 192 evaluates one, or more than one, rule based on the classification and determines for each of the rules an evaluation value. For example, the detector logic unit 192 may evaluate the following rules R0-R19, where i refers to input stream i:

R0: IF (i∈M2 & i∈N1) then D=1 OR
R1: IF (i∈M2 & i∈N2) then D=1 OR
R2: IF (i∈M2 & i∈N3) then D=1 OR
R3: IF (i∈M3 & i∈N1) then D=1 OR
R4: IF (i∈M3 & i∈N2) then D=1 OR
R5: IF (i∈M3 & i∈N3) then D=1 OR
R6: IF (i∈M3 & i∈N4) then D=1 OR
R7: IF (i∈M3 & i∈N5) then D=1 OR
R8: IF (i∈M4 & i∈N1) then D=1 OR
R9: IF (i∈M4 & i∈N2) then D=1 OR
R10: IF (i∈M4 & i∈N3) then D=1 OR
R11: IF (i∈M4 & i∈N4) then D=1 OR
R12: IF (i∈M4 & i∈N5) then D=1 OR
R13: IF (i∈M5 & i∈N1) then D=1 OR
R14: IF (i∈M5 & i∈N2) then D=1 OR
R15: IF (i∈M5 & i∈N3) then D=1 OR
R16: IF (i∈M5 & i∈N4) then D=1 OR
R17: IF (i∈M5 & i∈N5) then D=1 OR
R18: IF (i∈M5 & i∈N6) then D=1 OR
R19: IF i∈M6 then D=1.

Figure 8:
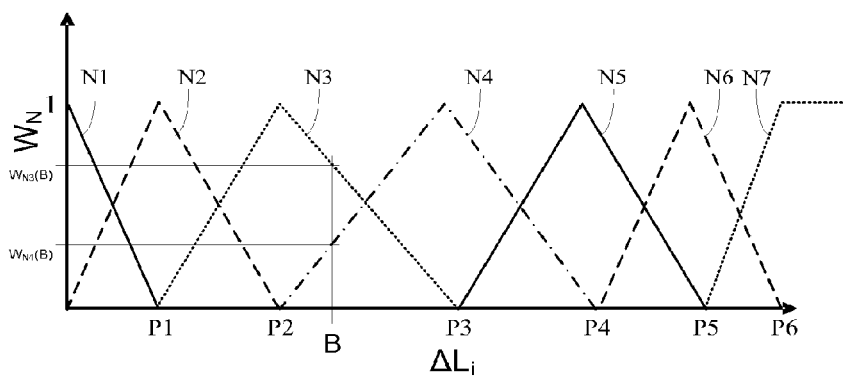
FIG. 8 schematically shows a graph illustrating classifying input streams in different categories, using the difference in loudness between input streams as a classifier.

The detector logic unit 192 may for each of these rules calculate an evaluation value E, for example by performing a calculation as can be described by $E_q = D_q * (W_{M(q)} + W_{N(q)})$, in which $W_{M(q)}$ and $W_{N(q)}$ represent the weighing factors for the categories $M_q$ and $N_q$ used in the rule q. For example for R18, supposing that as illustrated in FIGS. 7 and 8 $\lambda_i$=A, $\Delta\lambda_i$=B, then i∈M2 and i∈N3, the result would be $E_{18}=D_{18}*(W_{M2}(A)+W_{N3}(B))$.

The shown new dominant speaker detector 180 further comprises an adder 193 connected to the detector logic unit 192 and a comparator 194 connected to the adder 193. The adder 193 receives from the detector logic unit 192 the evaluation values and adds the evaluation values $E_1, E_2, \ldots, E_j$ to obtain a summed value $\Sigma$. The comparator 194 then compares the summed value $\Sigma$ with a threshold value Tr and outputs, at the detector output 195, a maximum number of dominant speakers value increase notification when the summed value $\Sigma$ exceeds the threshold value Tr.

Referring to back to FIG. 2, the second logic unit 302 may be connected to a decrement evaluation unit 200. The decrement evaluation unit 200 may be arranged to compare one, or more than one, parameter of one, or more than one, of the dominant speaker streams with a predetermined maximum number of dominant speakers value reduction criterion and output to the second logic unit 302 a maximum number of dominant speakers decrease notification when the parameter meets the predetermined maximum number of dominant speakers value reduction criterion. In response to the notification, the second logic unit 302 can decrease the maximum number of dominant speakers value stored in the memory 303.

Figure 4:
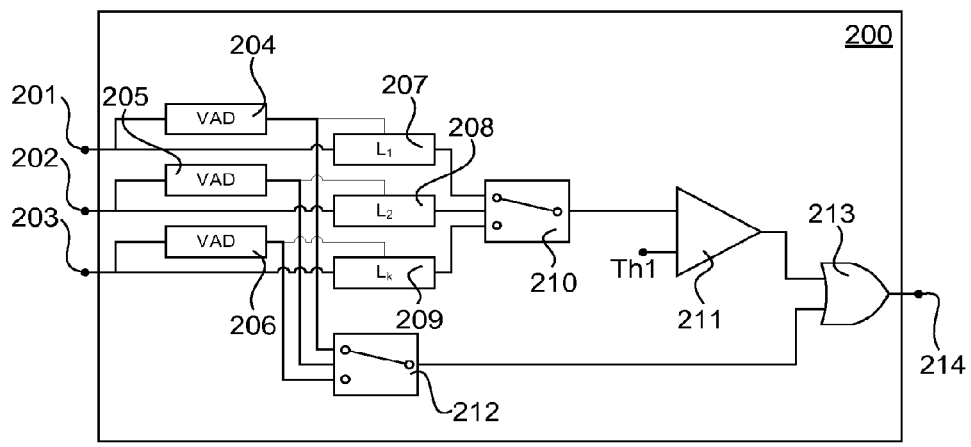
FIG. 4 schematically shows a block diagram of an example of an embodiment of a decrement evaluation unit.

In the example of FIG. 4, the decrement evaluation unit 200 comprises a voice detector 204-206 connected to the input interface 14. The voice detector 204-206, when in operation, detects voice in the dominant speaker streams.

The second logic unit 302 further comprises a loudness comparator 211 connected to the input interface 14. The loudness comparator 211 compares an intensity of at least voice in one, or more than one, of the dominant speaker streams with a loudness threshold value. The example of FIG. 4 comprises respective calculators 207-209 which are arranged to calculate for each of the input streams the loudness value from a parameter of the respective input stream representative of the loudness of the audio, e.g. as explained above. In the shown example, a separate calculator is present for each input stream and the calculators are connected to the input interface 14. For each of the calculators 207-209 a voice detector 204-206 is connected with an input to the input interface 14. The voice detectors 204-206 can detect voice in the input streams and enable the respective calculator 207-209 when voice is detected and disable the respective calculator 207-209, or otherwise ensure that it outputs a loudness number below the threshold Tr, when no voice is detected.

When in one, or more than one, of the dominant speaker streams no voice is detected and/or when for one, or more than one, of the dominant speaker streams the intensity is determined by the loudness comparator 211 to be below the loudness threshold value, Tr, the decrement evaluation unit 200 outputs the notification to the second logic unit 302. In response to the notification, the second logic unit 302 then decreases the maximum number of dominant speakers value $K_{max}$. For generating the notification, the shown example comprises an OR-gate 213 which is connected with a first input port to the comparator 211 and with a second input port to the voice detectors. The first input port is asserted by the loudness comparator 211 when one, or more than one, of the dominant speaker streams the intensity is determined by the loudness comparator 211 to be below the loudness threshold value, Tr. The second input port is asserted when one or more of the voice detectors 204-206 does not detect voice. The OR-gate 213 outputs a notification in the form of a binary 1 when at least one of the input ports is asserted, and outputs nothing (in the form of a binary 0) when none of the input ports is asserted.

The decrement evaluation unit 200 shown in FIG. 4 further comprises selectors 210,212 connected to respectively the calculator 207-209 and the voice detector 204-206 of the last dominant speaker stream elected as an input to the comparator 213. Thus, only the parameters of the last dominant speaker stream are subject to the evaluation in this example.

However, the decrement evaluation unit 200 may alternatively evaluator other dominant speaker streams as well, and for example comprise a dedicated comparator and voice detector for each of the dominant speaker stream.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Figure 5:
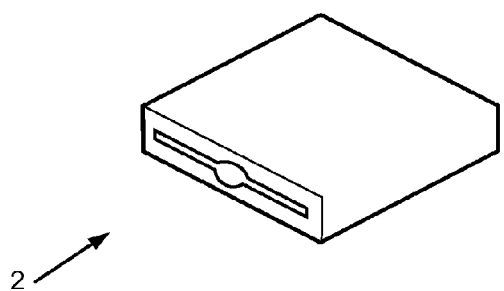
FIG. 5 schematically shows perspective view of a computer readable media.

The computer program may be stored internally on computer readable storage medium, e.g. as shown in FIG. 5, or transmitted to the computer system via a computer readable transmission medium. All or some of the computer program may be provided on computer readable media permanently, removably or remotely coupled to an information processing system. The computer readable media may for instance be a computer readable medium for placement in a receptacle for being read and include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. The computer readable medium may also be data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, instead of the linear functions illustrated in FIGS. 7 and 8 other functions, such as parabolic or hyperbolic may be used. Also, a different number of categories M,N and/or input streams may be used.

Also, the connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Furthermore, each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will further recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the voice detectors and calculators shown in FIGS. 2-4 may be shared by the different units.

Also for example, in one embodiment, the illustrated examples may be implemented as circuitry located on a single integrated circuit or within a same device. For example, the conference call system may be implemented as a suitable programmed processor, such as a general purpose microprocessor or a digital signal processor. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

What is claimed is:

1. A method comprising:
    receiving at a conference call system during a conference call a plurality of input speaker streams including a first input speaker stream, each input speaker stream representing an audio signal from a respective audio source;
    identifying a subset of the plurality of input speaker streams, wherein each input speaker stream of the subset is designated as a dominant speaker, the total number of input speaker streams in the subset being limited by a maximum number of dominant speakers;
    comparing a loudness value of the first input speaker stream to a loudness value of a second input stream of the plurality of input speaker streams that was most recently added to the subset; and
    changing the maximum number of dominant speakers based upon the comparison.

2. The method of claim 1, wherein the loudness value of the second input stream is determined at the time that the second input stream was added to the subset.

3. The method of claim 1, wherein the comparing is performed periodically.

4. The method of claim 1, wherein the comparing is performed continuously.

5. The method of claim 1, wherein the comparing is performed in response to detecting sound beyond a threshold at the first input speaker stream.

6. The method of claim 5, wherein detecting sound comprises detecting voice.

7. The method of claim 1, wherein comparing comprises:
    determining a loudness value difference between the loudness value of the first input speaker stream and the loudness value of the second input stream;
    classifying the loudness value of the first input speaker stream into a first category of a first set of categories;
    determining a first weighting factor based on the first category and on the loudness value of the first input speaker stream;
    classifying the loudness value difference into in a second category of a second set of categories; and
    determining a second weighting factor based on the second category and on the loudness value difference.

8. The method of claim 7, wherein comparing further comprises:
    determining, for each rule of a set of rules, an evaluation value based on the first category, the second category, the first weighting factor and the second weighting factor.

9. The method of claim 8, wherein comparing further comprises:
    summing the evaluation values; and
    comparing the sum of the evaluation values to a threshold value.

10. A conference call system, comprising:
    a memory for storing a maximum number of dominant speakers;
    an input for receiving during a conference call a plurality of input speaker streams including a first input speaker stream, each input speaker stream representing an audio signal from a respective audio source;
    a selection unit operable to:
        identify a subset of the plurality of input speaker streams, wherein each input speaker stream of the subset is designated as a dominant speaker, the total number of input speaker streams in the subset being limited by the maximum number of dominant speakers; and
        store a count of selected dominant speaker streams as a current number of dominant speakers, the count of selected dominant speaker streams being limited by the maximum number of dominant speakers;
    a mixer operable to mix the plurality of input speaker streams into an output stream;
    an output interface for outputting said output stream; and
    a selection control unit operable to:
        compare a loudness value of the first input speaker stream to a loudness value of a second input stream of the plurality of streams that was most recently added to the subset; and
        change said maximum number of dominant speakers based upon the comparison.

11. The conference call system of claim 10, wherein the loudness value of the second input stream is determined at the time that the second input stream is added to the subset.

12. The conference call system of claim 10, wherein the selection control unit compares a loudness value periodically.

13. The conference call system of claim 10, wherein the selection control unit compares a loudness value continuously.

14. The conference call system of claim 10, wherein the selection control unit compares a loudness value in response to sound beyond a threshold detected at the first input speaker stream.

15. The conference call system of claim 14, wherein the sound detected is voice.

16. The conference call system of claim 10, wherein compare a loudness value comprises:
    determine a loudness value difference between the loudness value of the first input speaker stream and the loudness value of the second input stream;
    classify the loudness value of the first input speaker stream into a first category of a first set of categories;
    determining a first weighting factor based on the first category and on the loudness value of the first input speaker stream;
    classify the loudness value difference into in a second category of a second set of categories; and
    determining a second weighting factor based on the second category and on the loudness value difference.

17. The conference call system of claim 16, wherein compare a loudness value further comprises:
    determine, for each rule of a set of rules, an evaluation value based on the first category, the second category, the first weighting factor and the second weighting factor.

18. The conference call system of claim 17, wherein compare a loudness value further comprises:
   sum the evaluation values; and
   compare the sum of the evaluation values to a threshold value.

19. A non-transitory computer readable medium containing a computer program executable by a programming apparatus, said computer program having code portions, when executed by said programming apparatus, perform functions comprising:
   receiving at a conference call system during a conference call a plurality of input speaker streams including a first input speaker stream, each input speaker stream representing an audio signal from a respective audio source;
   identifying a subset of the plurality of input speaker streams, input speaker streams of the subset being designated as dominant speakers, the total number of input speaker streams in the subset being limited by a maximum number of dominant speakers;
   comparing a loudness value of the first input speaker stream to a loudness value of a second input stream of the plurality of input speaker streams that was most recently added to the subset; and
   changing the maximum number of dominant speakers based upon the comparison.

20. The computer readable medium of claim 19, wherein the loudness value of the second input stream is determined at the time that the second input stream is added to the subset.

\* \* \* \* \*